United States Patent
Mocek (10) Patent No.: US 7,171,345 B2
(45) Date of Patent: Jan. 30, 2007

(54) SYSTEM AND METHOD FOR SIMULATING AN INPUT TO A TELEMATICS SYSTEM

(75) Inventor: Darryl Mocek, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 845 days.

(21) Appl. No.: 10/104,860

(22) Filed: Mar. 22, 2002

(65) Prior Publication Data

US 2003/0182027 A1 Sep. 25, 2003

(51) Int. Cl.
*G06G 7/48* (2006.01)
(52) U.S. Cl. .............. 703/8; 703/6; 703/13; 701/1; 701/36; 701/49; 340/853.8; 455/419; 455/67.11
(58) Field of Classification Search .......... 703/1–28, 703/36; 701/1–302; 455/1–899
See application file for complete search history.

(56) References Cited

U.S. PATENT DOCUMENTS

| | | | | |
|---|---|---|---|---|
| 5,557,683 A * | 9/1996 | Eubanks | | 381/86 |
| 5,793,648 A * | 8/1998 | Nagle et al. | | 703/8 |
| 6,127,947 A * | 10/2000 | Uchida et al. | | 340/999 |
| 6,236,909 B1 * | 5/2001 | Colson et al. | | 701/1 |
| 6,507,810 B2 * | 1/2003 | Razavi et al. | | 703/24 |
| 6,574,734 B1 * | 6/2003 | Colson et al. | | 713/200 |
| 6,609,051 B2 * | 8/2003 | Fiechter et al. | | 701/33 |
| 6,662,091 B2 * | 12/2003 | Wilson et al. | | 701/33 |
| 6,728,612 B1 * | 4/2004 | Carver et al. | | 701/33 |
| 6,757,324 B2 * | 6/2004 | Fitzrandolph | | 375/147 |
| 6,831,572 B2 * | 12/2004 | Strumolo et al. | | 340/903 |
| 2001/0021901 A1 * | 9/2001 | Ellis et al. | | 703/8 |
| 2002/0165784 A1 * | 11/2002 | Taggart et al. | | 705/26 |
| 2002/0173889 A1 * | 11/2002 | Odinak et al. | | 701/36 |
| 2002/0196250 A1 * | 12/2002 | Anderson et al. | | 345/420 |
| 2003/0083884 A1 * | 5/2003 | Odinak et al. | | 704/275 |
| 2003/0096641 A1 * | 5/2003 | Odinak | | 455/569 |
| 2003/0114965 A1 * | 6/2003 | Fiechter et al. | | 701/29 |
| 2003/0135304 A1 * | 7/2003 | Sroub et al. | | 701/1 |
| 2004/0203340 A1 * | 10/2004 | Oesterling | | 455/9 |
| 2004/0203436 A1 * | 10/2004 | Oesterling | | 455/67.11 |
| 2004/0249533 A1 * | 12/2004 | Wheals et al. | | 701/36 |
| 2005/0184904 A1 * | 8/2005 | Humphries et al. | | 342/357.07 |
| 2006/0167595 A1 * | 7/2006 | Breed et al. | | 701/1 |

OTHER PUBLICATIONS

U.S. Appl. No. 10/104,267, filed Mar. 22, 2002, entitled "Adaptive Connection Routing Over Multiple Communication Channels".

(Continued)

*Primary Examiner*—Kamini Shah
*Assistant Examiner*—Kibrom Gebresilassie
(74) *Attorney, Agent, or Firm*—Martine Penilla & Gencarella, LLP (57) ABSTRACT

A system and method for simulating a component in a telematics system is described. The system and method includes a simulating a component and a establishing a communication link between the simulated component and a corresponding carlet in a telematics control unit (TCU). The simulated component can also be adjusted to a desired condition and the TCU can be monitored for a responsive output.

18 Claims, 10 Drawing Sheets

OTHER PUBLICATIONS

U.S. Appl. No. 10/105,121, filed Mar. 22, 2002, entitled "Arbitration Of Communication Channel Bandwidth".

U.S. Appl. No. 10/104,351, filed Mar. 22, 2002, entitled "System and Method for Distributed Prefernce Data Services".

U.S. Appl. No. 10/104,297, filed Mar. 22, 2002, entitled "Asynchronous Protocol Framework".

U.S. Appl. No. 10/104,298, filed Mar. 22, 2002, entitled "Business-Model Agnostic Service Deployment Management Service".

U.S. Appl. No. 10/104,295, filed Mar. 22, 2002, entitled Manager Level Device/Service Arbitrator.

U.S. Appl. No. 10/104,246, filed Mar. 22, 2002, entitled Java Telematics System Preferences.

U.S. Appl. No. 10/104,243, filed Mar. 22, 2002, entitled "System and Method for Testing Telematics Software".

U.S. Appl. No. 10/104,294, filed Mar. 22, 2002, entitled "Java Telematics Emulator".

U.S. Appl. No. 10/104,245, filed Mar. 22, 2002, entitled "Abstract User Interface Manager With Prioritization".

* cited by examiner

SYSTEM AND METHOD FOR SIMULATING AN INPUT TO A TELEMATICS SYSTEM

CROSS REFERENCE TO RELATED APPLICATIONS

This application is related to (1) U.S. patent application Ser. No. 10/104,267, filed Mar. 22, 2002, and entitled "Adaptive Connection Routing Over Multiple Communication Channels," currently pending (2) U.S. patent application Ser. No. 10/105,121, filed Mar. 22, 2002, and entitled "Arbitration of Communication Channel Bandwidth," currently pending (3) U.S. patent application Ser. No. 10/104,351, filed Mar. 22, 2002, and entitled "System and Method for Distributed Preference Data Services," currently pending (4) U.S. patent application Ser. No. 10/104,297, filed Mar. 22, 2002, now issued as U.S. Pat. No. 6,925,466, and entitled "Asynchronous Protocol Framework," (5) U.S. patent application Ser. No. 10/104,298, filed Mar. 22, 2002, and entitled "Business-Model Agnostic Service Deployment Management Service," currently pending (6) U.S. patent application Ser. No. 10/104,295, filed Mar. 22, 2002, and entitled "Manager Level Device/Service Arbitrator," currently pending (7) U.S. patent application Ser. No. 10/104,246, filed Mar. 22, 2002, and entitled "Java Telematics System Preferences," currently pending (8) U.S. patent application Ser. No. 10/104,243, filed Mar. 22, 2002, and entitled "System Testing Telematics Software," currently pending (9) U.S. patent application Ser. No. 10/104,294, filed Mar. 22, 2002, now issue as U.S. Pat. No. 7,127,386, and entitled "Java Telematics Emulator," and (10) U.S. patent application Ser. No. 10/104,245, filed Mar. 22, 2002, now issue as U.S. Pat. No. 7,058,898, and entitled "Abstract User Interface Manager with Prioritization," which are incorporated herein be reference.

BACKGROUND OF THE INVENTION

1. Field of the Invention

The present invention relates generally to production, simulation and testing systems, and more particularly, to methods and systems for simulating a vehicle component capable of communicating with a telematics system.

2. Description of the Related Art

The electronic content and sophistication of automotive designs has grown markedly. Microprocessors are prevalent in a growing array of automotive information, entertainment, safety and control functions. Consequently, this electronic content is playing an increasing role in the sales and revenues of the automakers. The features provided by the electronic content include audio systems, vehicle stability control, driver activated power train controls, adaptive cruise control, route mapping, collision warning systems, etc. The significant increase of the electronic content of land based vehicles has concomitantly occurred with the explosive growth of the Internet and the associated data driven applications supplied through mobile applications.

Telematics, a broad term that refers to vehicle-based wireless communication systems and information services, promises to combine vehicle safety, entertainment and convenience features through wireless access to distributed networks, such as the Internet. Telematics offers the promise to move away from the hardware-centric model from audio and vehicle control systems that are built into devices that are custom designed for each vehicle, to infotainment delivered by plug-and-play hardware whose functionality can be upgraded through software loads or simple module replacement. Furthermore, new revenue streams will be opened up to automobile manufacturers and service providers through the products and services made available through telematics.

Since these infotainment systems integrate entertainment and information within a common envelope, the systems need to be highly integrated, open and configurable. However, the electronic systems currently on the market are custom designed for the make, model, year and world region in which the vehicle is sold. Additionally, the electronic systems being used today are linked by proprietary busses having severely limited bandwidth that are inadequate for data-intensive services combining information entertainment and safety. The proprietary and customized systems require a developer to know the underlying software and hardware application program interfaces (APIs) in order to develop applications for future infotainment systems. However, numerous proprietary and customized systems are spread across the various makes and models of the vehicles in the marketplace and even within the same model from year to year. Thus, the heterogeneous nature of the various systems essentially eliminates any benefits of economies of scale since equipment and software must be tailored to each model permutation.

Furthermore, the embedded boards that are used by vehicle manufacturers are tied with respect to mission critical systems, however they are difficult to work with for a developer. More particularly, the developing and testing of an application that provides functionality for telematics systems associated with a vehicle is burdensome not only because of the heterogeneous nature of the multitude of embedded boards used, but also because of the configuration of embedded boards in general, i.e., limited memory, serial ports, etc., that require obtaining specialized hardware for a developer to work with the systems. It should be appreciated that since some of these boards are not equipped with local storage, the board must be coupled to a personal computer that has a special software program that can load the operating system over a network. Additionally, debugging the application on the board itself requires tying into a serial port of the board and reviewing generated text. These barriers would deter an independent developer from providing infotainment applications outside of the mission critical vehicle system applications provided by vehicle manufacturers. The embedded boards as described herein, include at least one microprocessor configured to execute the telematics applications.

A self-contained personal computer model, also referred to as the fat client model, has been proposed to provide a uniform standard across makes and models of vehicles. Here, the client performs the bulk of the data processing operations. However, there are a number of shortcomings of this model. For instance, the tightly coupled operating system/hardware architecture does not provide multi-platform support. Additionally, desktop operating systems are too general purpose and too large to fit in the restricted physical envelope of telematics devices. More importantly, the susceptibility to viruses and the general lack of security would be an unacceptable risk for the automobile manufacturer.

In view of the forgoing, there is a need for a system and method to encourage independent developers to develop and test applications for execution by a telematics control unit in order for a wide range of functionality to be made available to telematics consumers.

SUMMARY OF THE INVENTION

Broadly speaking, the present invention fills these needs by simulating vehicle components in a telematic system. It should be appreciated that the present invention can be implemented in numerous ways, including as a process, an apparatus, a system, computer readable media, or a device. Several inventive embodiments of the present invention are described below.

A system and method for simulating a component in a telematics system is described. The system and method includes a simulating a component and a establishing a communication link between the simulated component and a corresponding carlet in a telematics control unit (TCU). The simulated component can also be adjusted to a desired condition and the TCU can be monitored for a responsive output.

In an embodiment, the system and method can also include selecting a vehicle component simulator from a collection of vehicle component simulators and retrieving a simulator description file (SDF) that corresponds to the selected vehicle component simulator. At least one component simulation identified in the SDF is activated. The SDF can be a list of links that identify a location for a corresponding component simulation file. The SDF can also be an XML document.

In one embodiment, activating at least one component simulation identified in the SDF can include displaying the activated component simulation. Several component simulations can also be displayed and manipulated simultaneously.

Another embodiment of the present invention includes a method of testing a telematics system, the method includes developing a carlet for a telematics control unit (TCU). The method also includes receiving a component simulation that produces an output to the carlet. The simulated component is coupled to the TCU.

Simulating a vehicle component allows a developer to test applications for a TCU without requiring the corresponding vehicle. The corresponding vehicle may not be available because it has not yet been produced, in one instance, or is otherwise unavailable or it is impractical to test the limits and functions of the application on the corresponding vehicle. The simulated component can also be adjusted to a test condition and the TCU can be monitored for a responsive output to the test condition.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

The embodiments of the invention described herein provide a component simulator which is a component of a development toolkit for the telematics system. As will be explained in more detail below, the client side of the telematics system includes a telematics control unit (TCU) that ties into the vehicle systems. In one embodiment, the TCU is associated with a user interface (UI) that provides a user with access to control options. It should be appreciated that the user can interact with the TCU through speech recognition, a mouse type device, touch pad or some other suitable mechanism, which has a minimal impact on the driver's ability to drive. Of course, a passenger of the vehicle is not limited by the restrictions on the driver with respect to the interaction with the UI.

The TCU can tie into any of the control systems, safety systems, entertainment systems, information systems, security systems, etc., of the vehicle. It will be apparent to one skilled in the art that the client side stack of the TCU is utilized to access a vehicle interface component for accessing in-vehicle devices and components, such as the speedometer, revolutions per minute (rpm) indicator (tachometer), oil pressure sensor, tire pressure sensor, etc. Thus, client side applications sitting in the TCU will allow for the functionality with respect to the vehicle systems as well as infotainment applications.

The development toolkit allows accessibility for software developers without the need for the developer to directly interface with the microprocessor of the embedded board. The developers of the client applications can develop and test the applications through the emulation, simulation and code checker software which can be downloaded to a developer's personal computer workstation.

In one embodiment, the telematics system deploys Java technology. It should be appreciated that Java technology's platform-independence and superior security model provide a cross-platform solution for the heterogeneous systems of a vehicle while maintaining a security architecture protecting against viruses and unauthorized access. Thus, the content or service provider is insulated against the myriad of car platforms while vehicle manufacturers are protected against hacker threats. In addition, Java application program interfaces (APIs) are available to support telematics mediums, such as speech recognition through Java Speech API (JSAPI), media delivery through Java Media Framework (JMF) and wireless telephony through Wireless telephony communications APIs (WTCA), etc.

One aspect of the development process which is addressed by the development toolkit is the emulation of the user interface of the TCU which may include a display screen, controls, speech interface, etc. while the simulator simulates vehicle devices and components. Therefore, the developer can emulate the screen and controls in order to create applications in an abstract mode without the need to have access to the embedded board or vehicle. In one embodiment of the invention, the developer has access to different configurations of the TCU so that client applications can be developed irrespective of the model of the TCU or for that matter the model of the vehicle. That is, the emulator allows the developer to write client applications for a TCU on a standard personal computer readily available in the market place. Furthermore, the emulator allows a developer to have a high level of confidence that the client application will behave the same when the application is deployed in the vehicle as it does on the emulator.

Another aspect of the development process, which is addressed by the development toolkit, is the simulation of the components in the vehicle that will communicate with the TCU. Therefore, the developer can simulate the vehicle component in order to test create applications in an abstract mode without the need to have access to the actual components in the vehicle. The component simulations may be run and manipulated on the developer's workstation and in communication with an actual or emulate TCU via a connection. The component simulator allows the developer to test the function of a carlet without the need of manipulating actual components of the vehicle. For example, if the developer wished to simulate the vehicle moving 130 MPH, then the developer can simulate a speedometer indicating 130 MPH and couple the output of the simulated speedometer to the TCU. Such as simulation is much easier and safer than actually driving the vehicle with the TCU installed in it to 130 MPH.

Another aspect of the development process, which is addressed by the development toolkit, is the code checker. The code checker checks the applications, such as a carlet, developed by the developer to ensure the application does not access or interfere with restricted portions of the telematics client stacks or gain access to restricted server applications or classes. In one embodiment, the code checker checks the classes and methods that are utilized by the application (e.g., a carlet) against a list of classes and methods available on the TCU. The applications may be restricted from using certain classes and methods available on the TCU due to safety, security, reliability, resource allocation and other reasons. Additionally, the code checker may also add a certificate to the application that certifies the application passed or been certified by the code checker. The certificate can also be encoded. As used herein a certificate can include any method of flagging or encrypting or otherwise identifying the application that has been approved by the code checker and is thereby able to safe to be used.

Figure 1:
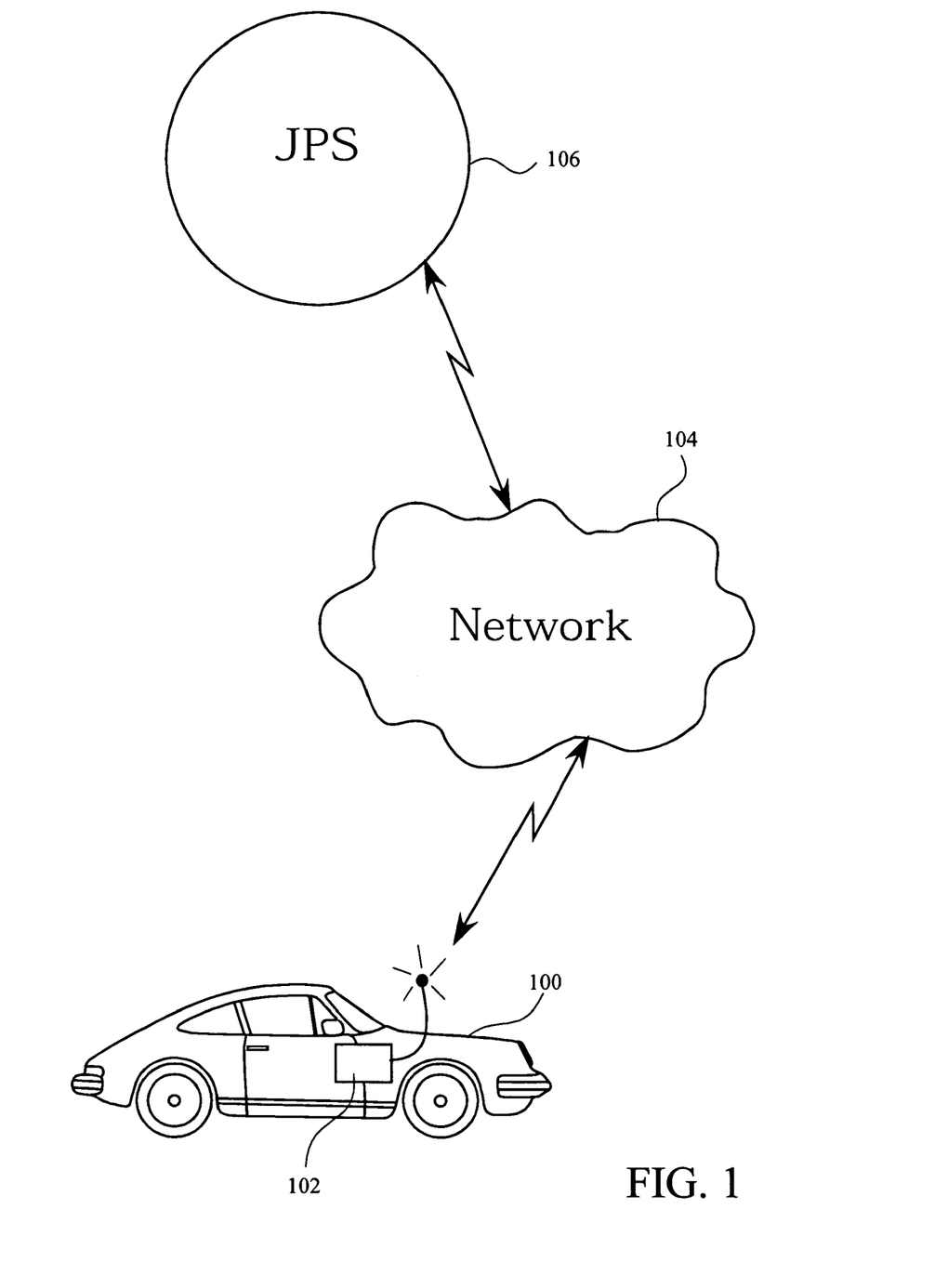
FIG. 1 is a high level schematic overview of an automotive telematics system in accordance with one embodiment of the invention.

FIG. 1 is a high level schematic overview of an automotive telematics system in accordance with one embodiment of the invention. A client/server architecture relying on standards and principles of modular design allows for functionality of the telematics system to be delivered to the customer through wireless access. The server side includes Java provisioning server (JPS) 106 in communication with network 104.

For a detailed description of JPS 106, reference may be made to U.S. Pat. No. 6,925,466, entitled "Asynchronous Protocol Framework," and having inventors Peter Strarup Jensen, Pavel S. Veselov, Shivakumar S. Govindarajapuram, and Shahriar Vaghar, assigned to the assignee of the present application, and which is hereby incorporated by reference.

The client side includes telematics control unit (TCU) 102 contained within the body a vehicle 100. TCU 102 is enabled to communicate with network 104 through wireless access. Of course, network 104 can be any distributed network such as the Internet and the wireless access protocol (WAP) can be any suitable protocol for providing sufficient bandwidth for TCU 102 to communicate with the network. It should be appreciated that the client/server architecture of FIG. 1 allows for the evolution from hard wired, self contained components to platform based offerings relying on software and upgrades. Thus, a service provider controlling JPS 106 can deliver an unbundled, open end-to-end solution enabling plug and play applications. For example, the service can be a tier-based service similar to home satellite and cable services. It will be apparent to one skilled in the art that an open platform, such as frameworks based on Java technology, enables a developer to create executable applications without regard to the underlying hardware or operating system.

Figure 2:
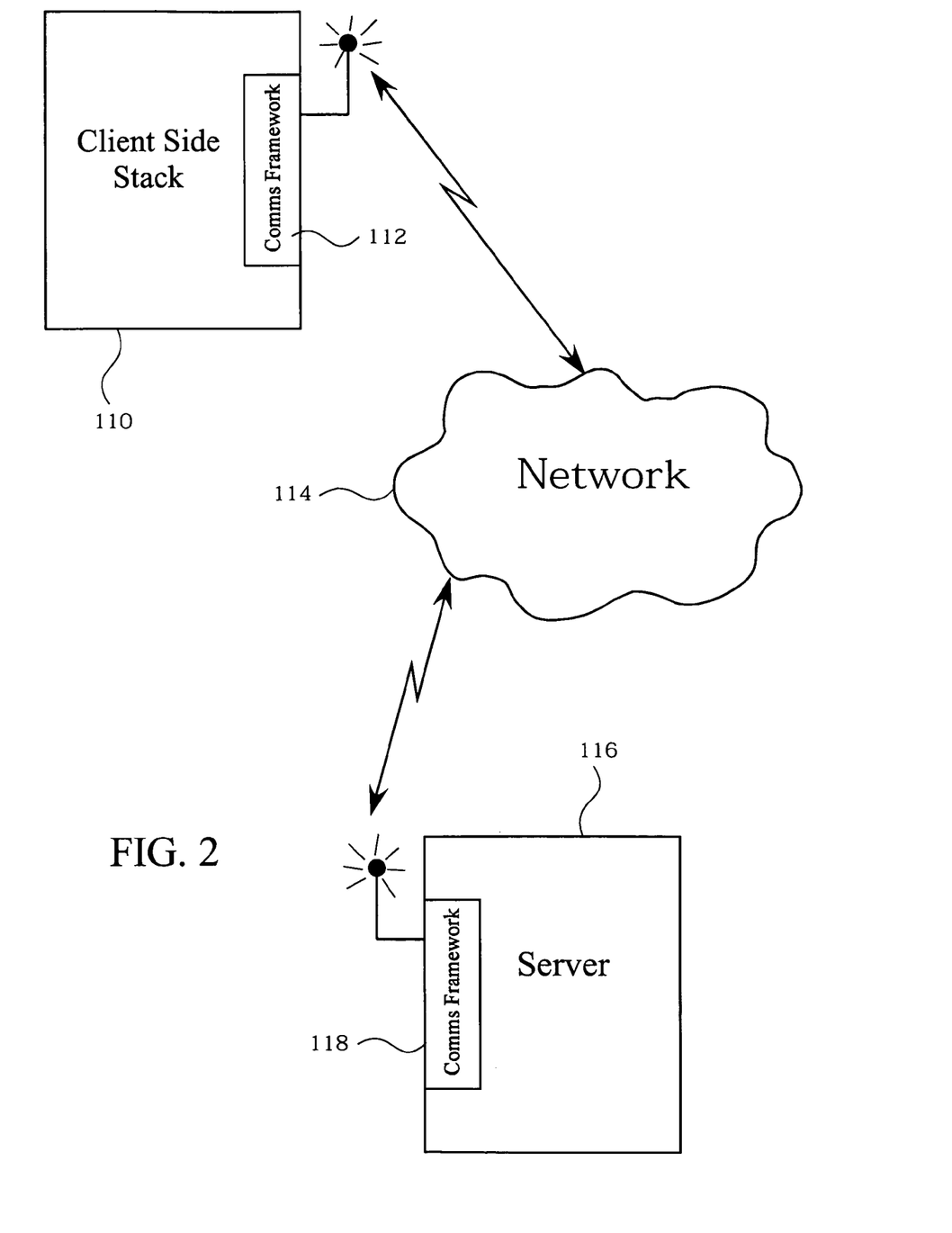
FIG. 2 is a schematic diagram of a telematics client communicating through a wireless network with a telematics server in accordance with one embodiment of the invention.

FIG. 2 is a schematic diagram of a telematics client communicating through a wireless network with a telematics server in accordance with one embodiment of the invention. Client side stack 110 includes the necessary layers for a client application, also referred to as a manager or a carlet, to be executed to provide functionality. As will be explained further below, the carlet has access to each layer of the client side stack 110. Included in client side stack 110 is client communication framework 112. Client communication framework 112 enables communication between the client side stack 110 and an application on server 116 through network 114. It should be appreciated that server 116 is not limited to a wireless connection. For example, server 116 can be hard-wired into network 114. One skilled in the art will appreciate that where server 116 communicates through a wireless connection with network 114, the communication proceeds through server communication framework 118. With respect to an embodiment where server 116 is hard-wired to network 114, the server can communicate with network 114 through a network portal (e.g., the Internet) rather than server communication framework 118. Additionally, network 114 can be any suitable distributed network, such as the Internet, a local area network (LAN), metropolitan area network (MAN), wide area network (WAN), etc.

Figure 3:
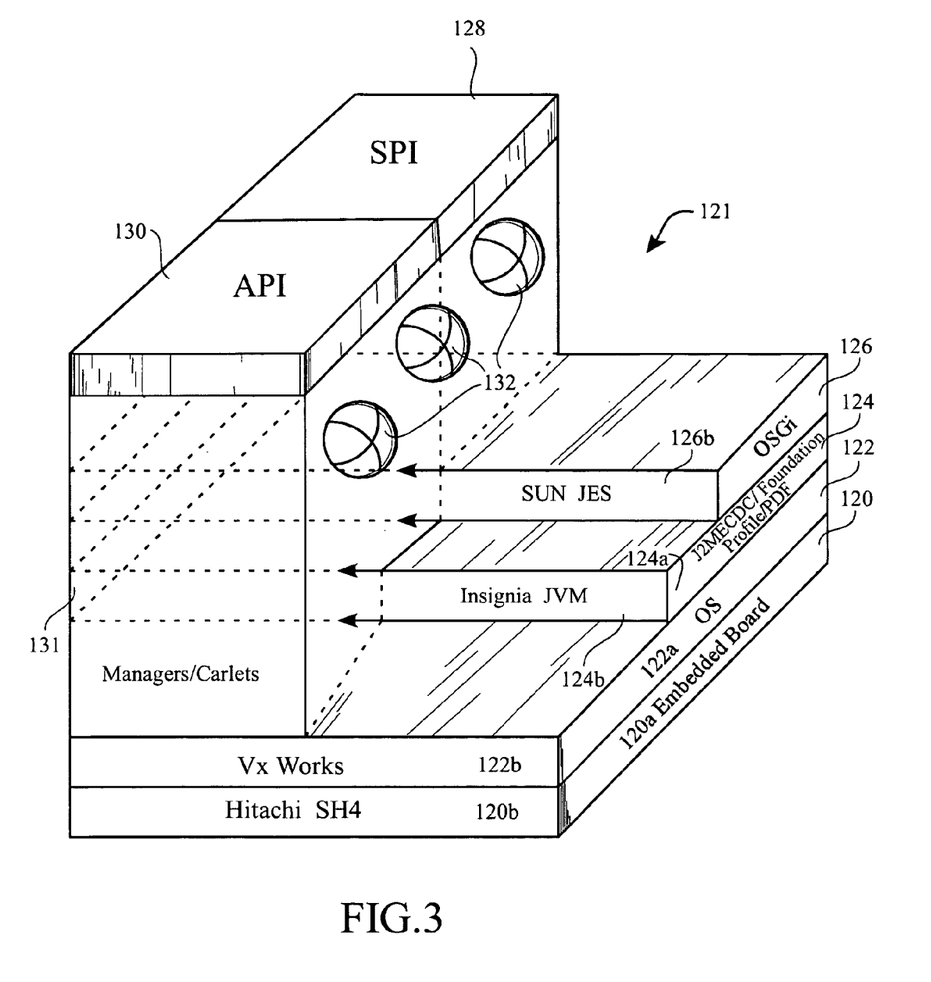
FIG. 3 is a three dimensional pictorial representation of a telematics client reference implementation of the client side stack of FIG. 2 in accordance with one embodiment of the invention.

FIG. 3 is a three dimensional pictorial representation of a telematics client implementation of the client side stack of FIG. 2 in accordance with one embodiment of the invention. Client side implementation 121 includes hardware layer 120 of the client includes an embedded board containing a telematics control unit (TCU). As mentioned with reference to FIG. 1, the TCU is incorporated into a vehicle. In one embodiment, the TCU is in communication with the electronic components of a vehicle through a vehicle bus. Alternatively, the TCU can communicate with electronic components of a vehicle through any available communication method such as wireless communication method (e.g., cellular, 802.11 wireless networking, Bluetooth, RFID systems, etc.), direct electrical connection that is separate or even combined with the vehicle bus. These components include the measurement of vehicle operating and safety parameters, such as tire pressure, speed, oil pressure, engine temperature, etc., as well as information and entertainment components, such as audio system settings, Internet access, environmental control within the cabin of the vehicle, seat positions, etc. One skilled in the art will appreciate that the telematics control unit is capable of integrating the functionality of various handheld information and entertainment (infotainment) devices, such as mobile phones, personal digital assistants (PDA), mp3 players, etc.

Still referring to FIG. 3, operating system layer 122 sits above hardware layer 120. Java virtual machine (JVM) layer 124 sits on top of operating system (OS) layer 122 and open services gateway initiative (OSGI) layer 126 sits on top of the JVM layer. It should be appreciated that the standard for JVM layer 124 includes Java 2 Platform Micro Edition (J2ME), Connected Device Configuration (CDC) or a Connected Limited Device Configuration (CLDC), Foundation Profile, Personal Profile or Personal Basis Profile. One skilled in the art will appreciate that J2ME Foundation Profile is a set of APIs meant for applications running on small devices that have some type of network connection, while J2ME CDC Personal Profile or Personal Basis Profile provides the J2ME CDC environment for those devices with a need for a high degree of Internet connectivity and web fidelity. The standards for each of the layers of the stack are provided on the right side of client side reference implementation 121. In particular, OSGI 126a, J2ME CDC 124a, OS 122a, and embedded board 120a are standards and to the left of the standards are examples of actual products that implement the standards. For example, OSGI 126a standard is implemented by Sun's Java Embedded Server (JES) 2.1 126b, J2ME 124a standard is implemented by Insignia's Virtual Machine 124b, OS 122a is implemented by Wind River's VxWorks real time operating system 122b, and embedded board 120a is an embedded personal computer based board such as Hitachi's SH4. It should be appreciated that the actual products are exemplary only and not meant to be limiting as any suitable product implementing the standards can be utilized.

One embodiment of a telematics client 131 includes the carlets 132, an application program interface (API) 130 and service provider interface (SPI) layer 128. Carlets 132 of FIG. 3 have access to each layer above and including OS layer 122. Application program interface (API) layer 130 is the layer that carlets use to communicate with the JTC. Service provider interface (SPI) layer 128 is a private interface that managers have among each other. One skilled in the art will appreciate OSGI layer 126 provides a framework upon which applications can run. Additional functionality over and above the JVM, such as lifecycle management, is provided by OSGI layer 126. It should be appreciated that the open services gateway initiative is a cross-industry working group defining a set of open APIs for a service gateway for a telematics system. These APIs consist of a set of core framework APIs. In order to deploy services and their implementations, OSGI defines a packaging unit called a service bundle. A service bundle is a Java Archive (JAR) file containing a set of service definitions along with their corresponding implementation. Both infrastructure services and carlets are deployed as service bundles. Some of the functionality for arbitrating, controlling and managing devices and resources, e.g., speakers cell phones, etc., is provided by OSGI layer 126. However, one skilled in the art will appreciate that separate arbitration services may also be required.

As used herein, a carlet is a Java™ application. In an alternative embodiment, the carlet may not be limited to being a Java™ application. For each function or task to be processed on the client side or between the client and server sides, a carlet is invoked to manage the operation. In this manner, carlets can be independently written, tested, and launched for use on a telematics system. By way of example, a carlet can be written to control or monitor the activity of automobile components (e.g., tires, engine oil, wiper activity, steering tightness, maintenance recommendations, air bag control, transmission control, etc.), and to control or monitor applications to be processed by the telematics control unit (TCU) and interacted with using the on-board automobile monitor. As such, specialized carlets can be written to control the audio system, entertainment modules (e.g., such as on-line games or movies), voice recognition, telecommunications, email communications (text and voice driven), etc. Accordingly, the type of carlets that can be written is unlimited.

Figure 4:
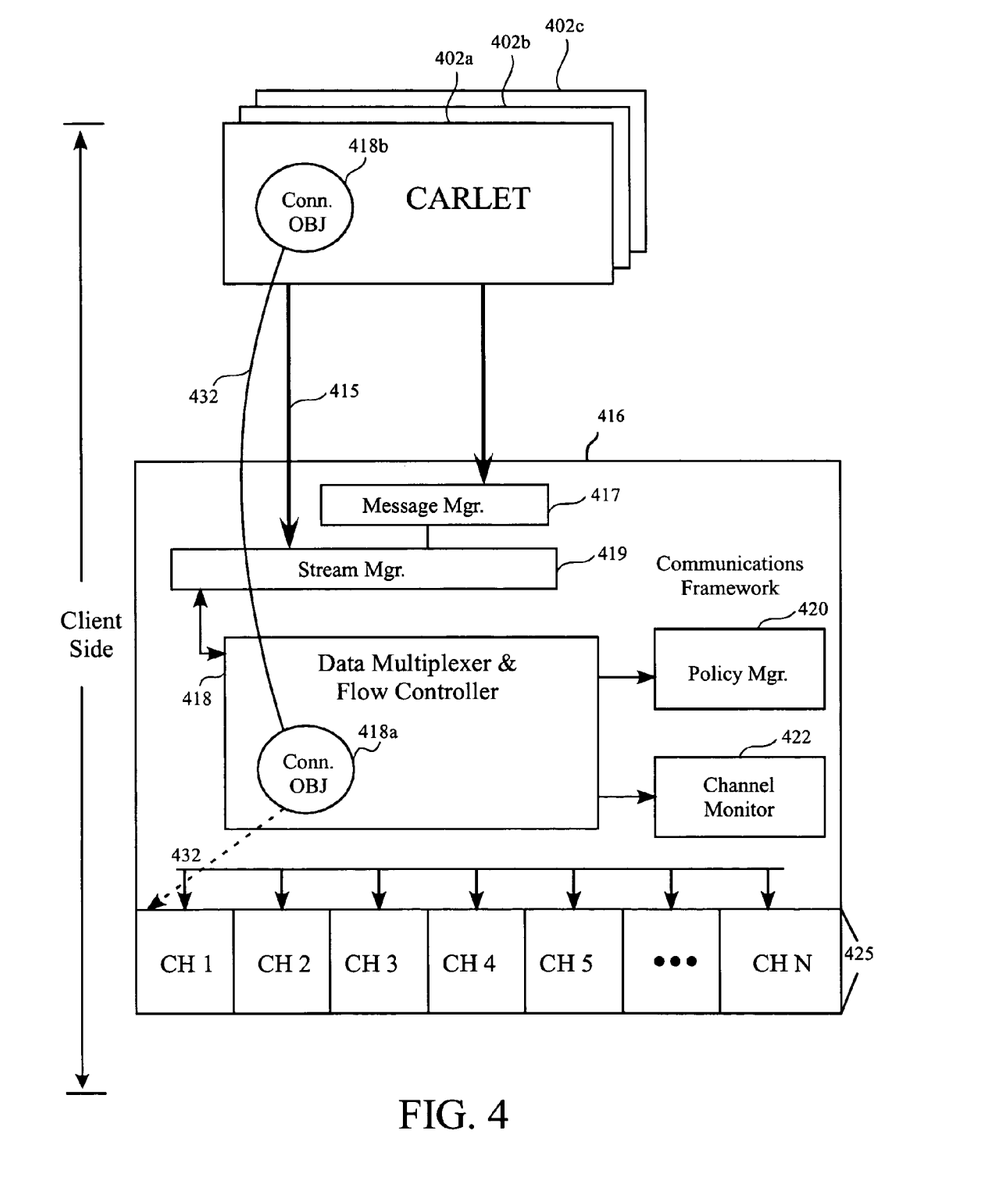
FIG. 4 is a high level schematic diagram of the interaction between a carlet and a communications framework on the client side of a telematics system in accordance with one embodiment of the invention.

FIG. 4 is a high level schematic diagram of the interaction between a carlet and a communications framework on the client side of a telematics system in accordance with one embodiment of the invention. It should be appreciated that the server side has a similar communication framework to establish and enable synchronous communication between the client side (e.g., a telematics control unit on a vehicle) and the server side (e.g., a Java telematics server). The communications framework 416 includes a message manager 417, a stream manager 419, a data multiplexer and flow controller 418, a policy manager 420, a channel monitor 422, and an interface to the various physical channels available to the communications framework of the client side.

Still referring to FIG. 4, when a particular carlet application 402a–402n (i.e., carlet is requested, the carlet will communicates with the stream manager 419 and request that a connection be established. In response, the stream manager 419 will request a connection object (Conn. OBJ) 418a from the data multiplexer and flow controller 418. Once a channel satisfying the request is available, the data multiplexer and flow controller 418 will return a connection object (Conn. OBJ) 418b back to the carlet. Thus, a communication link is established between the carlet application 402a–402n via the connection objects 418a and 418b of the data multiplexer and flow controller 418. In one embodiment, the connection object 418a of the data multiplexer and flow controller 418 has the ability to switch between channels 425 that are available to the communications framework 416 of the client side. Here, code contained in the policy manager enables selection of different channels depending upon availability, the type of communication desired, bandwidth requirements for a given data transfer or transfers, payment of a bandwidth fee, subscription level, etc.

A vehicle simulation system allows the simulation of vehicle components and can communicate with a telematics control unit (TCU) such as a TCU installed in a vehicle. The simulator allows developers to create modules, which represent components in the vehicle. For example, one simulated component may be a speedometer. The simulator also allows a developer to test a TCU when a vehicle is not available. The simulator can also allow a developer to test inputs to a TCU from simulated vehicle components that do yet exist. For example, a tire pressure sensor system may be under development for a given vehicle but is not yet installed on the vehicle. The developer can test the carlet that inputs the information from the tire pressure sensor system to the TCU by simulating the tire pressure sensor system.

The simulator can simulate components in the vehicle that can communicate with the TCU. The TCU typically ties into a vehicle via a vehicle bus. Simulator allows any condition of the vehicle to be simulated and input to the TCU. For example speed of the vehicle, location of the vehicle, engine speed, etc. By way of example, a speedometer may be simulated. The simulated speedometer is linked to a speedometer carlet in a TCU to monitor the vehicle speed. In one embodiment the carlet may be part of a TCU emulation.

Figure 5:
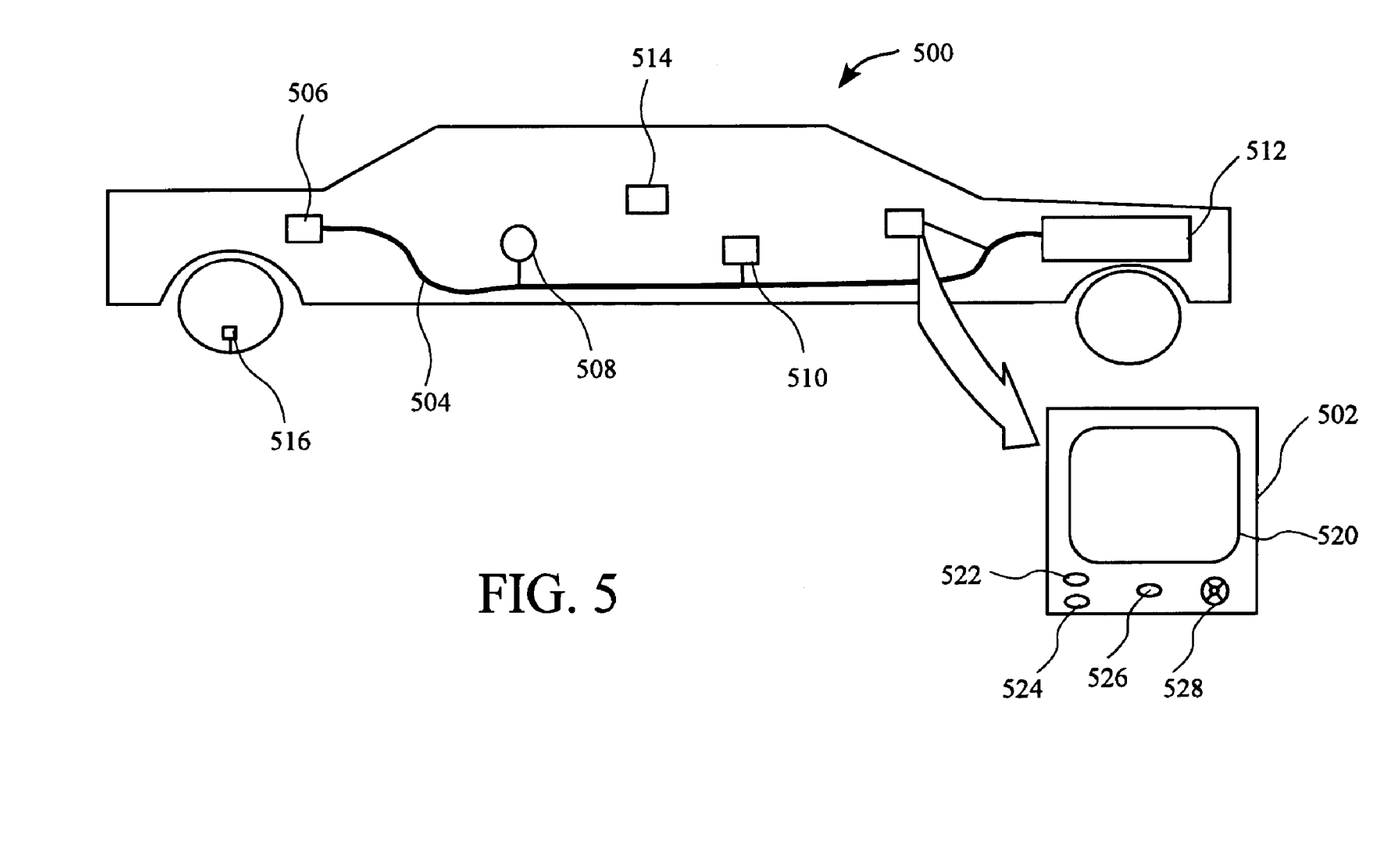
FIG. 5 illustrates a vehicle 500 with a TCU installed in accordance with one embodiment of the present invention.

FIG. 5 illustrates a vehicle 500 with a TCU 502 installed in accordance with one embodiment of the present invention. FIG. 5 also illustrates the vehicle bus 504 and several components 506, 508, 510, 512 in the vehicle 500 which are coupled to the vehicle bus 504. Additional components 514, 516 are also included in the vehicle 500 that are not coupled to the vehicle bus 504 but which can communicate to the TCU 502, are also shown. Also shown is the TCU 502 coupled to the vehicle bus 504. The vehicle bus 504 may include information such as speed of the vehicle, vehicle security data, engine data such as temperature, engine speed (RPM), performance data, and other data.

The TCU 502 can include a display screen 520, and various controls 522, 524, 526, 528. The controls can include a "home" button 522, a select button 524, a back button 526, or other suitable controls. A complex control 528 can also be included. The complex control 528 can include navigational directional arrows and a center button or knob or joystick or other pointing device such as may be used to move a cursor.

The TCU 502 can also communicate with components 514, 516 that are not coupled to the vehicle bus 504, such as a wireless tire pressure sensor or other wired, wireless, infrared, or other components that are not coupled to the vehicle bus 504.

Figure 6:
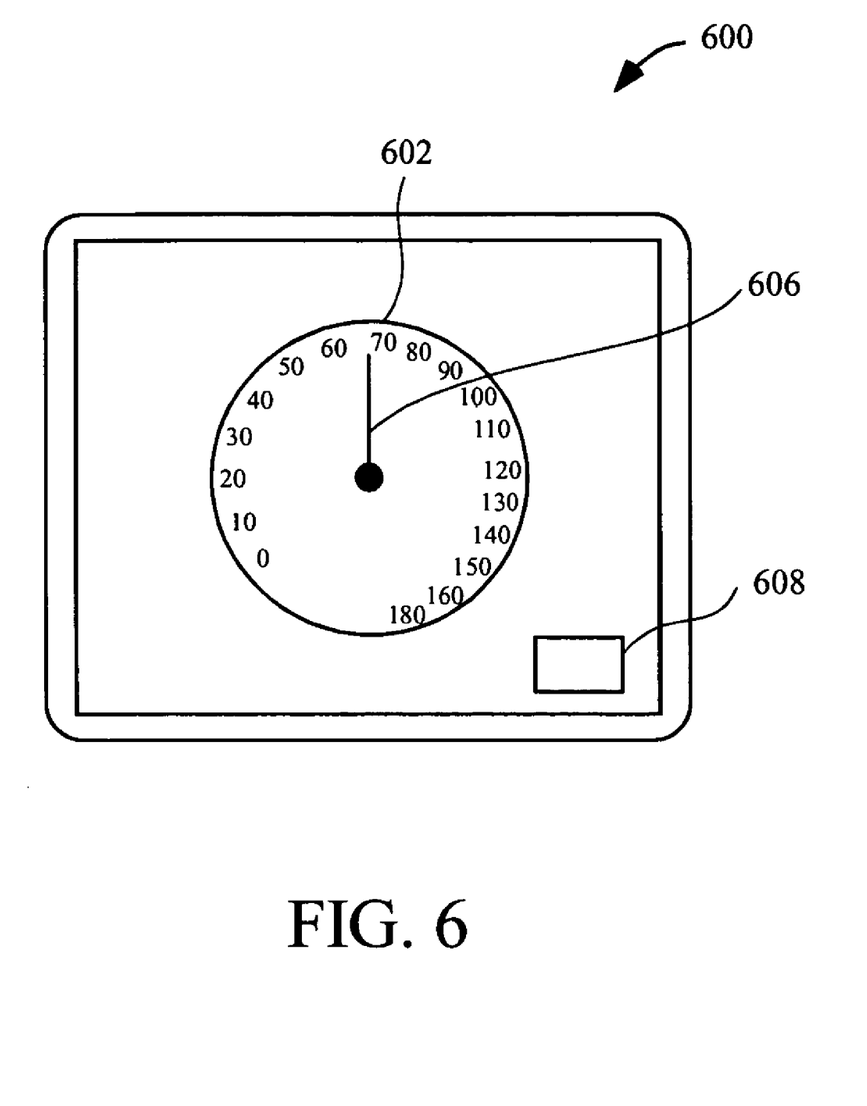
FIG. 6 shows a simulated speedometer 600 in accordance with one embodiment of the present invention.

FIG. 6 shows a simulated speedometer 600 in accordance with one embodiment of the present invention. The simulated speedometer 600 includes a typical speedometer-like "face" or display of a dial 602 with numbers along the circumference and an indicator needle 606. The display of the simulated component (e.g., the speedometer face) will typically be substantially similar to the display of the actual component in the corresponding vehicle. By way of example, if the vehicle included a digital read-out speedometer, then the simulated speedometer would likely include a similar digital display, in one embodiment. However, the simulated component display and the actual display in the corresponding vehicle may also be different. If, however, the vehicle component being simulated did not have a display in the corresponding vehicle, then the simulation of the component can be up to the convenience of the developer or adopt a standard or default display.

The simulated speedometer 600 can include interactive controls 608 so that a developer can manipulate the simulated speedometer 600 to a desired condition. For example, the developer may have developed a carlet that provides an "excessive speed" warning to the driver whenever the vehicle exceeds 65 mph. To test the carlet, the developer invokes the simulated speedometer 600, establishes an output from the speedometer 600 to the carlet in the TCU. The developer can then adjust the speed indicated on the simulated speedometer 600 such as by moving the speedometer needle 606 to the an indicated speed greater than 65 mph. Alternatively, the interactive control 608 can be an up/down arrow combination or a text box as shown, or other type of interactive control as applicable to the type of simulated component.

If the interactive control 608 is a text box, the developer can enter in a desired condition such as "66" so that the indicator needle 606 will move to indicate 66 MPH and the simulated will output a corresponding 66 MPH signal to the TCU. If the carlet is functioning properly, the TCU will output the desired excessive speed warning.

Complex carlets can also be tested. A complex carlet is a carlet that has inputs from multiple components. For example a complex carlet may be a carlet that includes an input from the speedometer, the tire pressure sensor, and the engine speed to provide a notice that the tires have too low pressure for the current speed of the vehicle.

Figure 7A:
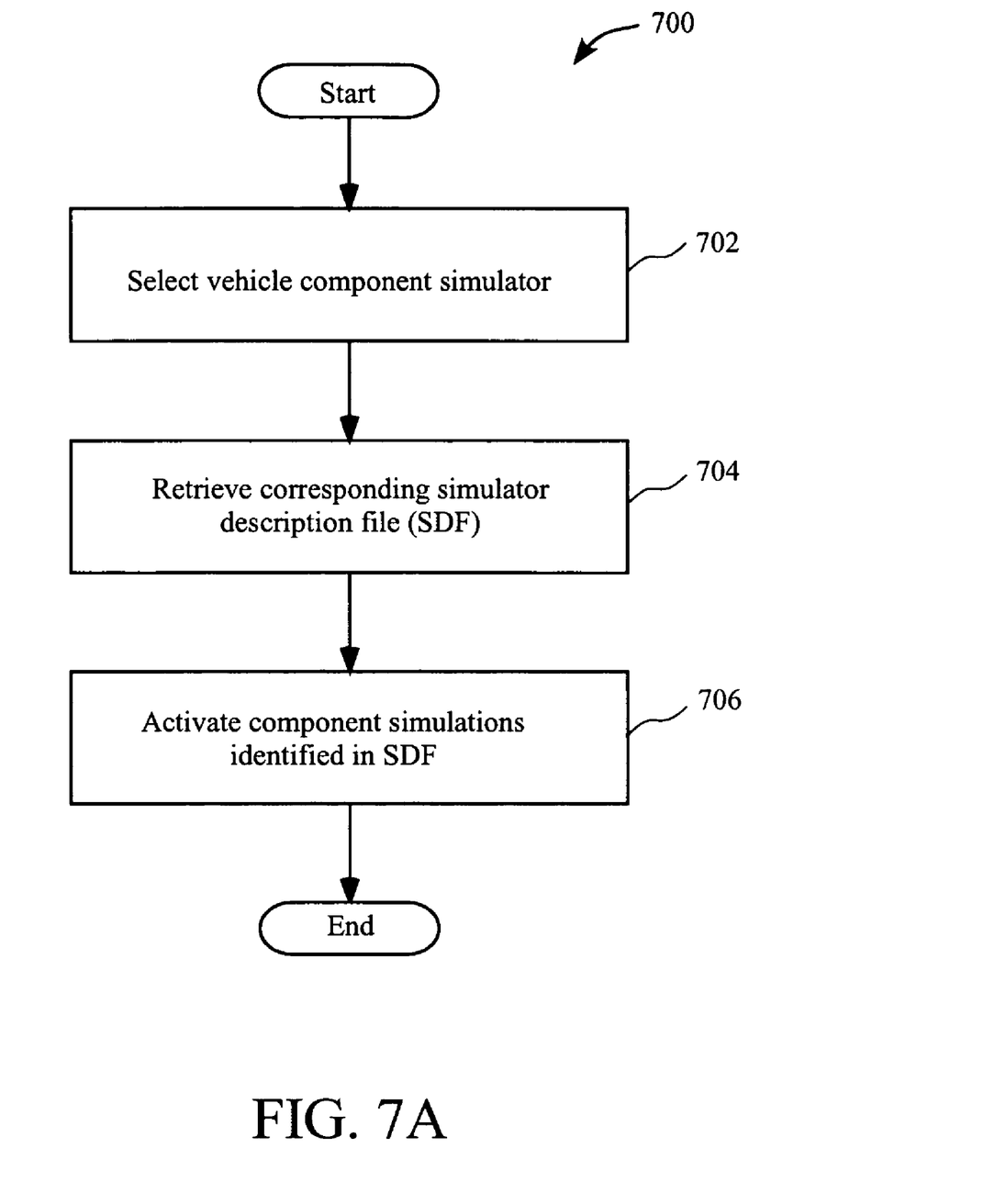
FIG. 7A is a flow chart of the method operations for simulating the components in a specific vehicle in accordance with one embodiment of the present invention.

FIG. 7A is a flow chart of the method operations for simulating the components in a specific vehicle in accordance with one embodiment of the present invention. The component simulator of a vehicle such as a Cadillac Escalade, is selected in operation 702. A simulator description file (SDF) corresponding to the Cadillac Escalade is then retrieved in operation 704. A SDF is a list of simulated components for a specific vehicle. For example, an SDF may include all the simulated components for a Cadillac Escalade. In one embodiment, the SDF may be provided by a manufacturer (e.g., Cadillac) for each of their product models (e.g., Escalade).

In one embodiment, a vehicle manufacturer can have a website where all of the SDFs or specific simulated components for the manufacturer's products can be downloaded. The developer can use the SDFs develop applications for that manufacturers products.

Figure 7B:
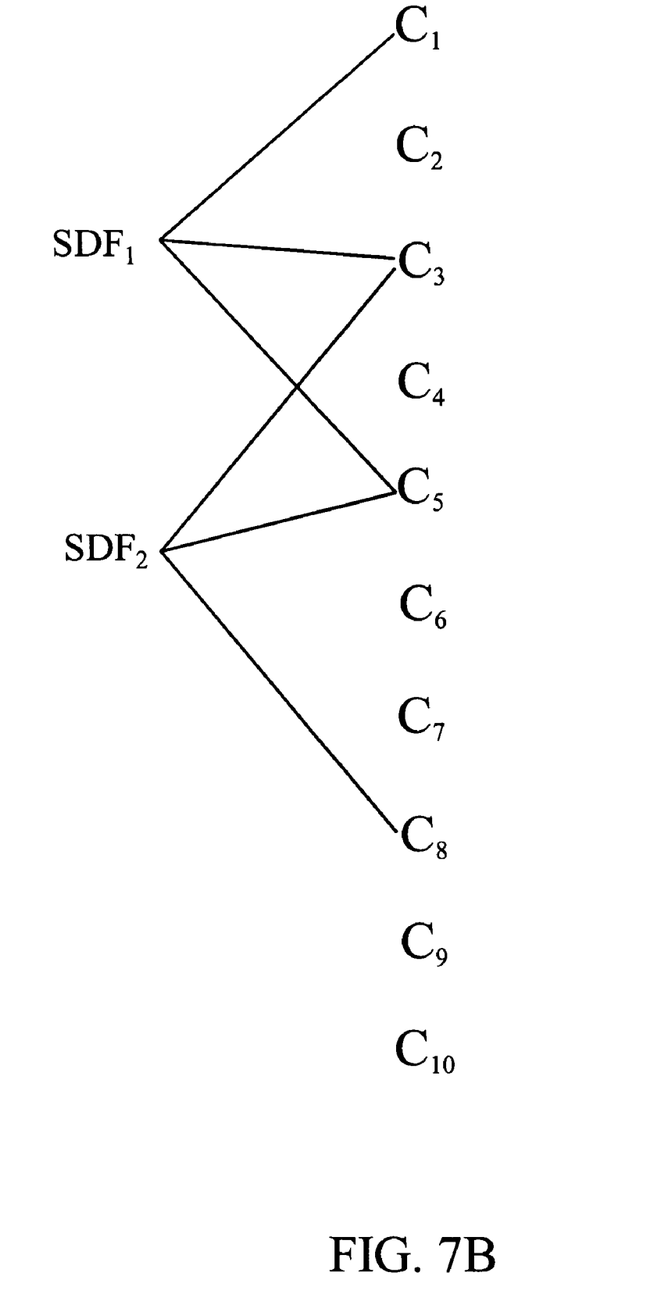
FIG. 7B is a graphical representation of multiple simulator description files (SDFs) in accordance with one embodiment of the present invention.

In operation 706, the individual component simulators included in the SDF are activated and then the method ends. For example, FIG. 7B is a graphical representation of multiple simulator description files (SDFs) in accordance with one embodiment of the present invention. $SDF_1$, may represent, for example, the Cadillac Escalade. $SDF_2$, may, for example, represent the Chevrolet Corvette. Several components, $C_1$–$C_{10}$, represent individual component simulations. $SDF_1$, includes simulated components $C_1$, $C_3$, $C_5$ and $C_7$. Similarly, $SDF_2$, includes components $C_3$, $C_5$ and $C_8$. Other simulator description files can use some of the shown components $C_1$–$C_{10}$ and/or other components that are not shown. In one embodiment, an SDF can include an XML or an HTML document. Alternatively, the SDF can include a list of universal resource locators (URLs) or other links to Internet addresses where the individual component simulations can be found.

Figure 7C:
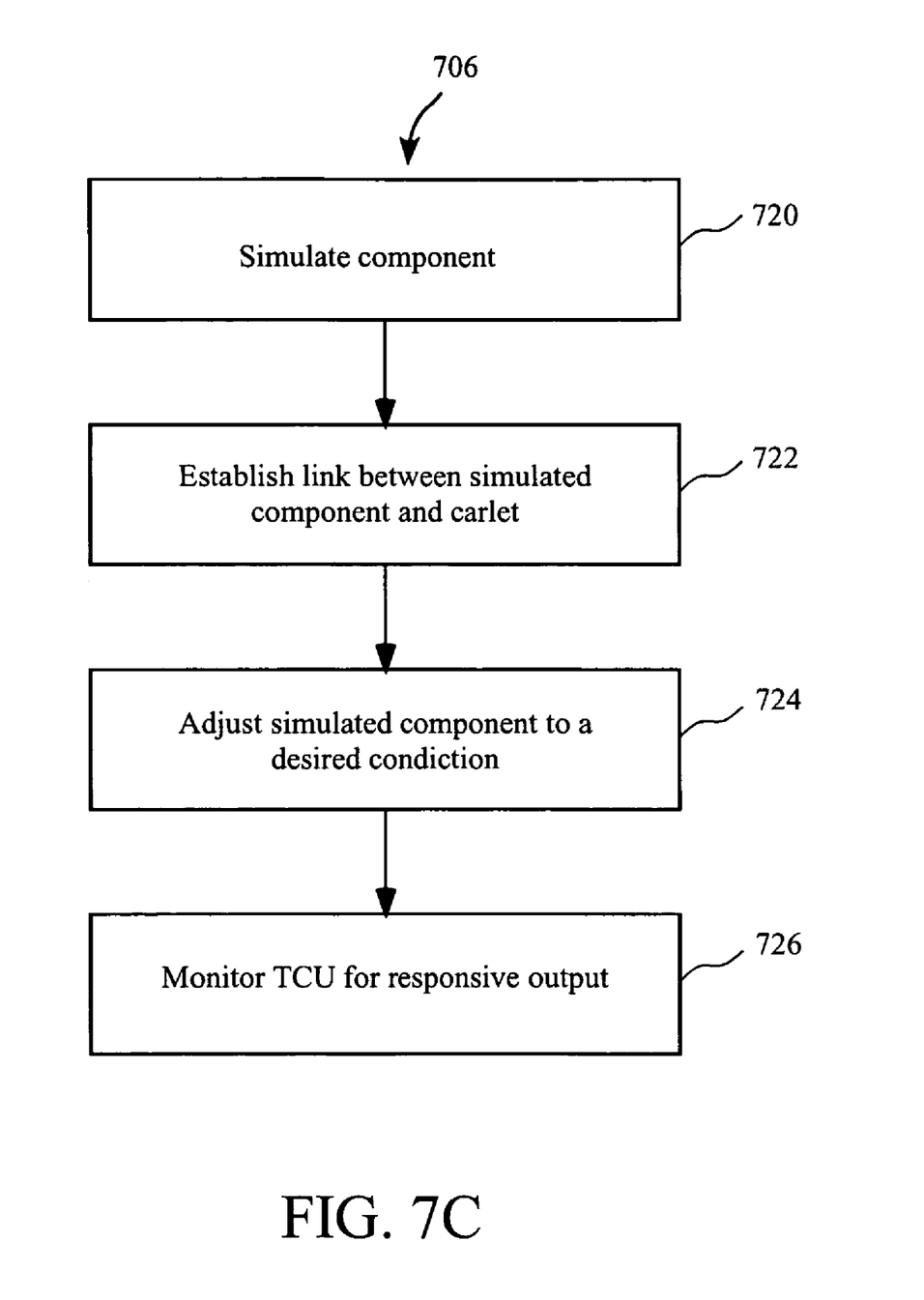
FIG. 7C is a flowchart of the method operations of activating each of the component simulations identified in the SDF such as in FIG. 7A above, according to one embodiment of the present invention.

FIG. 7C is a flowchart of the method operations of activating each of the component simulations identified in the SDF such as in operation 706 in FIG. 7A above, according to one embodiment of the present invention. In operation 720, the simulated component is activated such as in a simulation computer that can be linked to the TCU. In operation 722 a communication link to a corresponding carlet in the TCU under test is established. The simulated component can be adjusted to a desired (e.g. test) condition in operation 724. In operation 726, the TCU under test is monitored for an output responsive to the condition of the simulated component. The TCU can also be an emulated TCU in one embodiment. Alternatively, the TCU under test can be connected directly to the component simulation. In yet another alternative, the TCU can be installed or otherwise coupled to a vehicle having at least some actual vehicle components in communication with the TCU and the component simulation for at least one additional component that may or may not be included in the vehicle.

Figures 8A, 8B, 8C:
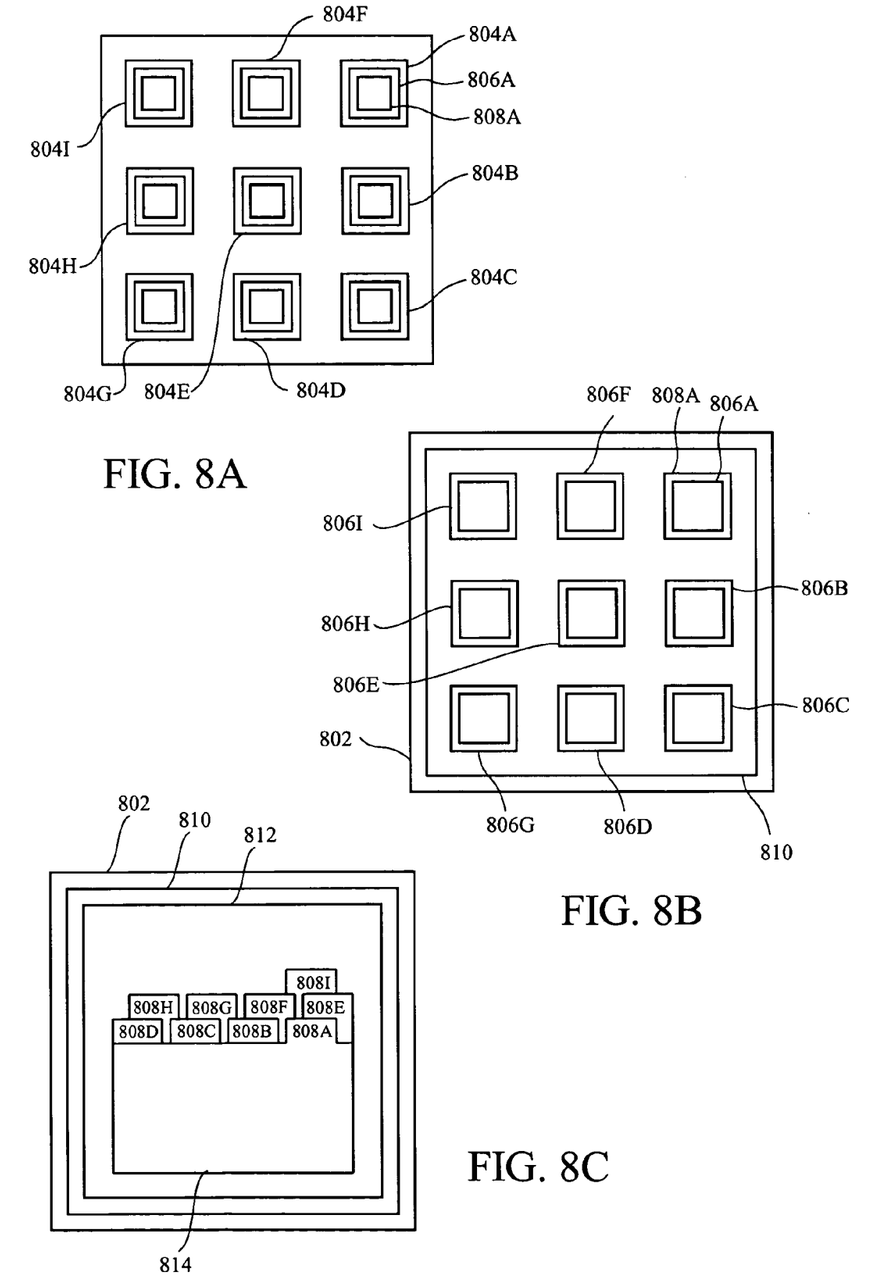
FIG. 8A shows nine simulated components displayed on one computer screen in accordance with one embodiment of the present invention.
FIG. 8B also shows nine simulated components displayed on one computer screen in accordance with another embodiment of the present invention.
FIG. 8C also shows nine simulated components displayed on one computer screen in accordance with still another embodiment of the present invention.

In one embodiment, activating an SDF can cause each of the to component simulations to be displayed on the developer's computer screen. FIGS. 8A–C illustrate several embodiments of displaying multiple simulated components. Combinations of the embodiments described in FIGS. 8A–C may also be used to display multiple simulated components. Each simulated component is displayed so that the developer can manipulate the simulated component and combinations of the simulated components.

FIG. 8A shows nine simulated components displayed on one computer screen 802 in accordance with one embodiment of the present invention. Each simulated component is displayed in a separate application window 804A–I. Within each of the application windows 804A–I, is a frame 806A–I, respectively, that contains a Java™ panel displaying a simulated component 808A–I, respectively. The developer can readily access each of the simulated components.

FIG. 8B also shows nine simulated components displayed on one computer screen 802 in accordance with another embodiment of the present invention. The computer screen 802 includes one application window 810. The single application window 810 includes nine frames 806A–I. Each of the nine frames 806A–I contains a Java™ panel displaying a simulated component 808A–I, respectively.

FIG. 8C also shows nine simulated components displayed on one computer screen 802 in accordance with still another embodiment of the present invention. The computer screen in 802 includes a single application window 810 and a single frame 812. The single frame 812 includes a "tabbed" Java™ panel 814. Each of the tabbs on the tabbed Java™ panel 814, correspond to a simulated component 808A–I, respectively. The developer can alternate between simulated components 808A–I by selecting the tab corresponding to the desired simulated component.

In yet another embodiment the simulator can include a list of simulated components that can be automatically executed to automatically test each simulated component on TCU under test. Similarly the test results can be output and recorded automatically. In one embodiment, each simulated component can be automatically set to execute predetermined tests (e.g., predetermined test conditions on the simulated component) on the TCU. For example, the values and intervals for testing can be input. By way of example, referring back to the simulated speedometer, the tests can configure the speedometer to be at 50 MPH at time T1 then at time T2, 51 MPH, T3 at 52 MPH, and so forth allowing sufficient elapsed time between the times (T1, T2, T3 . . . ) to collect responsive outputs from the TCU.

Alternatively, the TCU emulator describe above can include the list of simulated components that can be automatically executed to automatically test each simulated component on an emulated TCU under test.

As used herein a carlet is a Java application. For each function or task to be processed on the client side or between the client and server sides, a carlet is invoked to manage the operation. In this manner, carlets can be independently written, tested, and launched for use on a telematics system. By way of example, a carlet can be written to control or monitor the activity of automobile componenets (e.g., tires, engine oil, wiper activity, steering tightness, maintenance recommendations, air bag control, transmission control, etc.). A carlet can be written to control or monitor applications to be processed by the telematics control unit (TCU) and interacted with using the on-board automobile monitor.

As such, specialized carlets can be written to control the audio system, entertainment modules, such as on line games or movies, voice recognition, telecommunications, email communications (text and voice driven), etc. Accordingly, the type of carlets that can be written is unlimited. Carlets may be pre-installed or downloaded from a server. A carlet may or may not have an API which may be invoked by other carlets. The carlet may or may not have running threads of its own.

In practice, system carlets most likely will be written by the automobile manufacturer, a Tier 1 supplier (e.g., a supplier that supplies components to a vehicle manufacturer) or a service provider who will be most knowledgeable of critical vehicle component operation, while non-vehicle system carlets can be written by independent software companies. Each carlet may therefore, in one embodiment, be associated with a set of properties. These properties, among other things, will dictate what minimum level of bandwidth should be provided by the communications framework.

As an overview, the Java virtual machine (JVM) is used as an interpreter to provide portability to Java applications. In general, developers design Java applications as hardware independent software modules, which are executed on Java virtual machines. The Java virtual machine layer is developed to operate in conjunction with the native operating system of the particular hardware on which the communications framework 416c is to run. In this manner, Java applications (e.g., carlets) can be ported from one hardware device to another without requiring updating of the application code.

Unlike most programming languages, in which a program is compiled into machine-dependent, executable program code, Java classes are compiled into machine independent byte-code class files which are executed by a machine-dependent virtual machine. The virtual machine provides a level of abstraction between the machine independence of the byte-code classes and the machine-dependent instruction set of the underlying computer hardware. A class loader is responsible for loading the byte-code class files as needed, and an interpreter or just-in-time compiler provides for the transformation of byte-codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "bytecode". The bytecode is then converted (interpreted) into machine code at runtime. Upon finding a Java applet, the Web browser invokes a Java interpreter (Java Virtual Machine), which translates the bytecode into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Although the present invention is described based on the Java programming language, other programming languages may be used to implement the embodiments of the present invention, such as other object oriented programming languages. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software application can be written using an object-oriented programming language whereby the program's functionality is implemented using objects. Examples of object-oriented programming languages include C++ as well as Java.

Furthermore the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the TCU discussed above, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data that can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the operations in FIGS. 7A and 7C are not required to be performed in the order illustrated, and that all the processing represented by the operations may not be necessary to practice the invention. Further, the processes described in FIGS. 7A and 7C can also be implemented in software stored in any one of or combinations of the electronic data storage known in the art.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for simulating an input to a telematics system comprising:
   simulating a component including:
   selecting a vehicle component simulator from a plurality of vehicle component simulators;
   retrieving a corresponding simulator description file (SDF), wherein the retrieved SDF corresponds to the selected vehicle component simulator and includes at least one component for a selected vehicle simulation; and
   activating at least one component simulation identified in the SDF;
   displaying the activated component simulation; and
   establishing a communication link via a telematics client framework between the simulated component and a corresponding cadet in a telematics control unit (TCU) wherein the telematics client framework includes a client communications framework including a message manager, a stream manager, a data multiplexer, a flow controller, a policy manager, a channel monitor and an interface to a plurality of physical channels available to the client communications framework and wherein the TCU includes a hardware layer, a real-time operating system, Java virtual machine (JVM) layer, an open services gateway initiative (OSGi) layer, and a plurality of client applications, the plurality of client applications including an interface to the plurality of client applications.

2. The method of claim 1, further comprising:
enabling an adjustment of the simulated component to a desired condition; and
enabling monitoring of the TCU for a responsive output.

3. The method of claim 1 wherein the TCU is an emulated TCU.

4. The method of claim 1, wherein the SDF includes an XML file.

5. The method of claim 1, wherein the SDF includes a plurality of links and wherein each of the plurality of links identify a location for a corresponding component simulation file.

6. The method of claim 1, wherein the vehicle component simulator identifies a component simulator for each of a plurality of components included in the selected vehicle.

7. The method of claim 1, wherein each of the plurality of activated component simulation is displayed.

8. The method of claim 1, wherein enabling an adjustment of the simulated component to a desired condition includes enabling an input to an interactive control on the simulated component.

9. A system for simulating a vehicle component comprising:
A processor; and
A storage facility coupled to the processor and containing instruction executable by the processor which configure the system to:
simulate a component;
establish a communication link via a telematics client framework between the simulated component and a corresponding cadet in a telematics control unit (TCU) wherein the telematics client framework includes a client communications framework including a message manager, a stream manager, a data multiplexer, a flow controller, a policy manager, a channel monitor and an interface to a plurality of physical channels available to the client communications framework and wherein the TCU includes a hardware layer, a real-time operating system, Java virtual machine (JVM) layer, an open services gateway initiative (OSGi) layer, and a plurality of client applications, the plurality of client applications including an interface to the plurality of client applications;
select a vehicle component simulator from a plurality of vehicle component simulators;
retrieve a corresponding simulator description file (SDF), wherein the retrieved SDF corresponds to the selected vehicle component simulator and includes at least one component for a selected vehicle simulation;
activate at least one component simulation identified in the SDF; and
display the activated component simulation.

10. The system of claim 9, further comprising instructions executable by the processor which configure the system to:
adjust the simulated component to a desired condition; and
monitor the TCU for a responsive output.

11. The system of claim 9, further comprising instructions executable by the processor which configure the system to automatically:
adjust the simulated component to each one of a plurality of desired conditions; and
monitor the TCU for a responsive output to each one of the plurality of desired conditions.

12. The system of claim 9, wherein the communication link between the simulated component and a corresponding carlet in the TCU includes a network communication link.

13. The system of claim 9, wherein the TCU is an emulated TCU.

14. The system of claim 9, wherein the SDF includes an XML file.

15. The system of claim 9, wherein the SDF includes a plurality of links and wherein each of the plurality of links identify a location for a corresponding component simulation file.

16. A method of testing a telematics system comprising:
developing a carlet for a telematic control unit (TCU), wherein the TCU includes a hardware layer, a real-time operating system, a Java virtual machine (JVM) layer, an open services gateway initiative (OSGi) layer, and a plurality of client applications, the plurality of client applications including an interface to the plurality of client applications;
receiving a component simulation that produces an output to the carlet wherein the component simulation includes:
selecting a vehicle component simulator from a plurality of vehicle component simulators;
retrieving a corresponding simulator description file (SDF), wherein the retrieved SDF corresponds to the selected vehicle component simulator and includes at least one component for a selected vehicle simulation;
activating at least one component simulation identified in the SDF;
displaying the activated component simulation;
coupling the simulated component to the TCU via a telematic client framework between the simulated component and a corresponding carlet in a telematics control unit (TCU) wherein the telematics client framework includes a client communications framework including a message manager, a stream manager, a data multiplexer, a flow controller, a policy manager, a channel monitor and an interface to a plurality of physical channels available to the client communications framework;
enabling an adjustment of the simulated component to a test condition; and
enabling monitoring of the TCU for a responsive output corresponding to the test condition.

17. The method of claim 16, wherein receiving a component simulation includes retrieving the component simulation from a storage that includes a plurality of component simulations.

18. The method of claim 16, wherein retrieving the component simulation from a database of a plurality of component simulations includes selecting the component simulation from a vehicle component simulation.

* * * * *